INVENTOR
VINCENT B. STEFFEN
BY
ATTORNEY

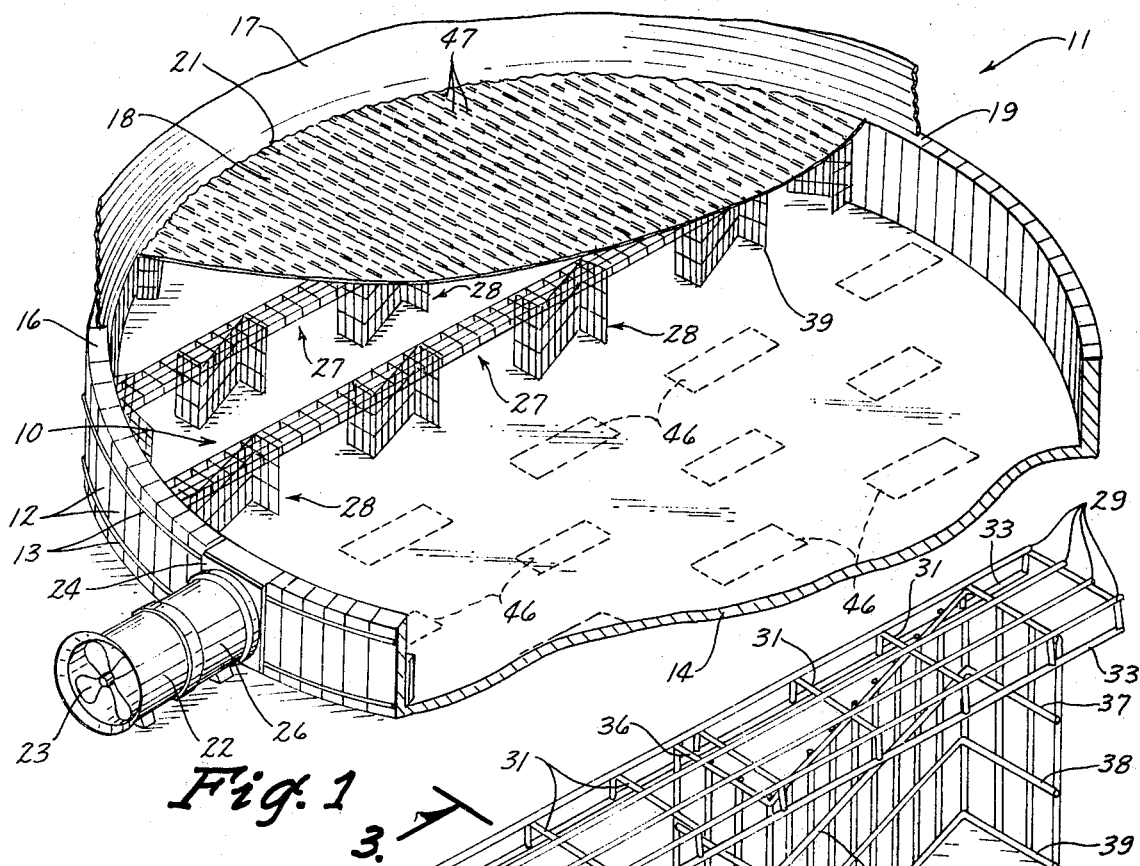
Fig. 1
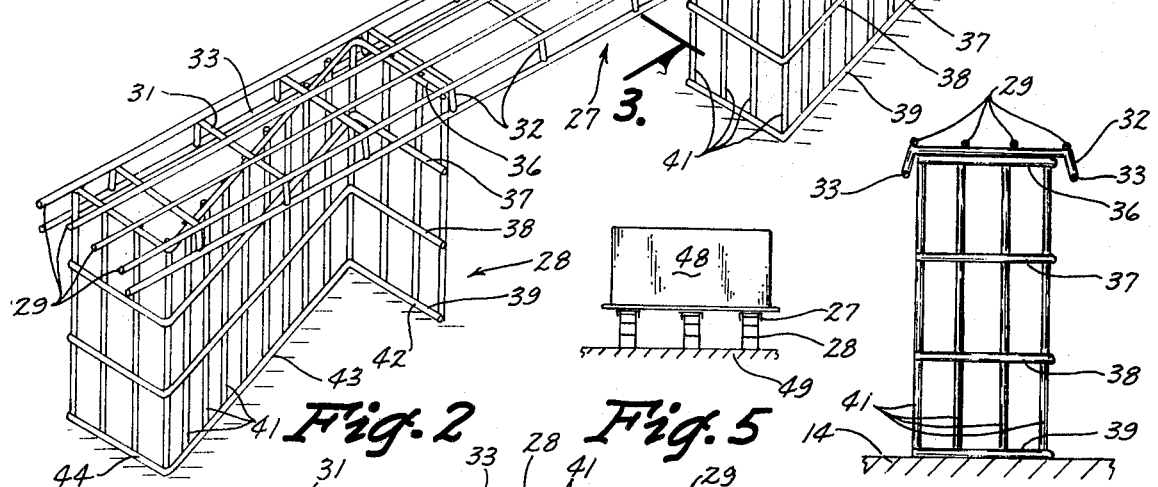
Fig. 2    Fig. 5
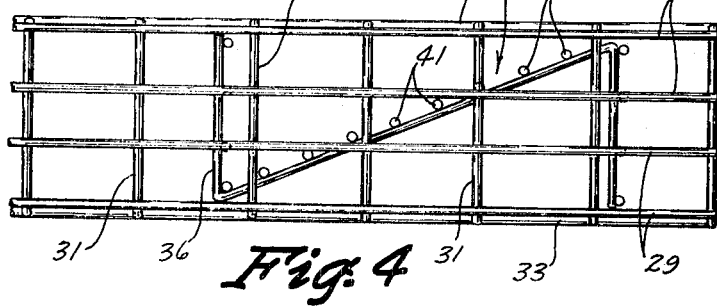
Fig. 4
Fig. 3
INVENTOR
VINCENT B. STEFFEN
BY
N. Robert Henderson
ATTORNEY

United States Patent Office 3,512,322
Patented May 19, 1970

3,512,322
OPEN SUPPORT FOR SUSPENDING A PERFORATED FLOOR WITHIN A STORAGE BIN
Vincent B. Steffen, New Hampton, Iowa, assignor to Dover Corporation (De-Sta-Co Division), a corporation of Delaware
Filed June 6, 1968, Ser. No. 735,140
Int. Cl. E04b 1/70; E04f 17/04
U.S. Cl. 52—263                                    4 Claims

ABSTRACT OF THE DISCLOSURE

This invention relates to an open support device for suspending a perforated floor in a storage bin in which a relatively free circulation of air is desired, the support device comprising a plurality of vertical disposed gridiron-type bases, being substantially Z-shaped so as to be free-standing and a plurality of horizontal gridiron-type frames resting on top of the bases, the frame forming a substructure of the perforated flooring, the bases and frames being of heavy gage steel wire or rod.

Cross-references to related applications

Reference is made to my copending application Ser. No. 581,411 now Pat. No. 3,426,445, a continuation of application Ser. No. 386,181 now abandoned, entitled Base for Steel Storage Bin.

Background of the invention

This invention relates generally to the field of free standing open supports and particularly to open supports for suspending perforated flooring in a storage bin.

It is commonplace today for many farmers to store their crops following harvest in an enclosed storage bin. Most often, the stored crops contain excessive moisture because of their exposure to the elements when harvested. Therefore it is necessary when storing these crops that adequate ventilation be provided to insure a free circulation of air about the stored crops in order to avoid the possibility that some of the crop will spoil or rot.

Presently on the market there are a number of storage bins combining a drying unit to overcome the moisture problem. These combinations include a storage chamber and a plenum chamber separated by a perforated floor upon which the stored crop rests, the plenum chamber being below the floor and connecting a blower for forcing dry air into the bin. The dry air is distributed about the entire plenum chamber and dispersed to the storage chamber through the perforations in the floor separating the two chambers of the bin.

Heretofore, the perforated flooring has usually been supported by wooden planks, horizontally traversing the bin in parallel rows, the wooden planks being supported by various vertical uprights spaced about the bin foundation floor. An example of such is illustrated in U.S. Pat. No. 2,818,009. The disadvantages of this type of arrangement are that the vertical uprights are of such a construction that the circulation of air about the plenum chamber is interfered with because of their solid construction, and the solid planking hinders the flow of air to that portion of grain or crop lying on the floor immediately above the plank. In addition, the use of wood within a drying bin creates a possible fire hazard. This invention is believed to overcome these disadvantages.

Summary of the invention

This invention relates to an open support device for suspending a perforated floor within a storage bin, the device comprising a horizontal frame of steel or like bars connected to form a gridiron to support a floor, the frame having a flat horizontal surface and downwardly flanged sides, and open vertical uprights supporting the horizontal frame, the uprights being of steel or like rods integrated and shaped so as to be self-standing, the uprights being of Z-shaped and having flat support arm portions on its top portion to receive the horizontal frame.

It is an object of this invention to provide an improved support to suspend a perforated floor in a storage bin.

It is another object of this invention to provide a support which is relatively open so as not to interfere with the free movement of air within the plenum chamber of the bin.

It is yet another object of this invention to provide an open support device for a perforated floor which is sufficiently strong to withstand the weight of a stored crop resting upon the perforated floor.

It is still another object to provide a support device for a perforated floor within a storage bin which is non-inflammable.

It is an object of this invention to provide an open support for suspending objects above the ground or floor.

It is another object of this invention to provide a support device which may be stacked compactly one upon another so as to be stored and shipped in the least amount of space.

It is yet another object of this invention to provide a support device which may be easily assembled without need for tools or implements.

It is still another object of this invention to provide an open support device which is capable of fulfilling all of the above enumerated objects, yet is simple, economical, and rugged in construction.

These and other objects of this invention will become readily apparent when taken in conjunction with the following description and drawings.

Brief description of the drawings

FIG. 1 is a perspective view of the base of a storage bin with the perforated flooring cut away to show the positioning of the invention therein;

FIG. 2 is an enlarged perspective view of the device of this invention;

FIG. 3 is a cross-sectional view as taken along the line 3—3 of FIG. 2;

FIG. 4 is a plan view of FIG. 3;

FIG. 5 is a reduced elevational view of the invention showing an object being supported thereon.

Description of the preferred embodiment

Figure 6:
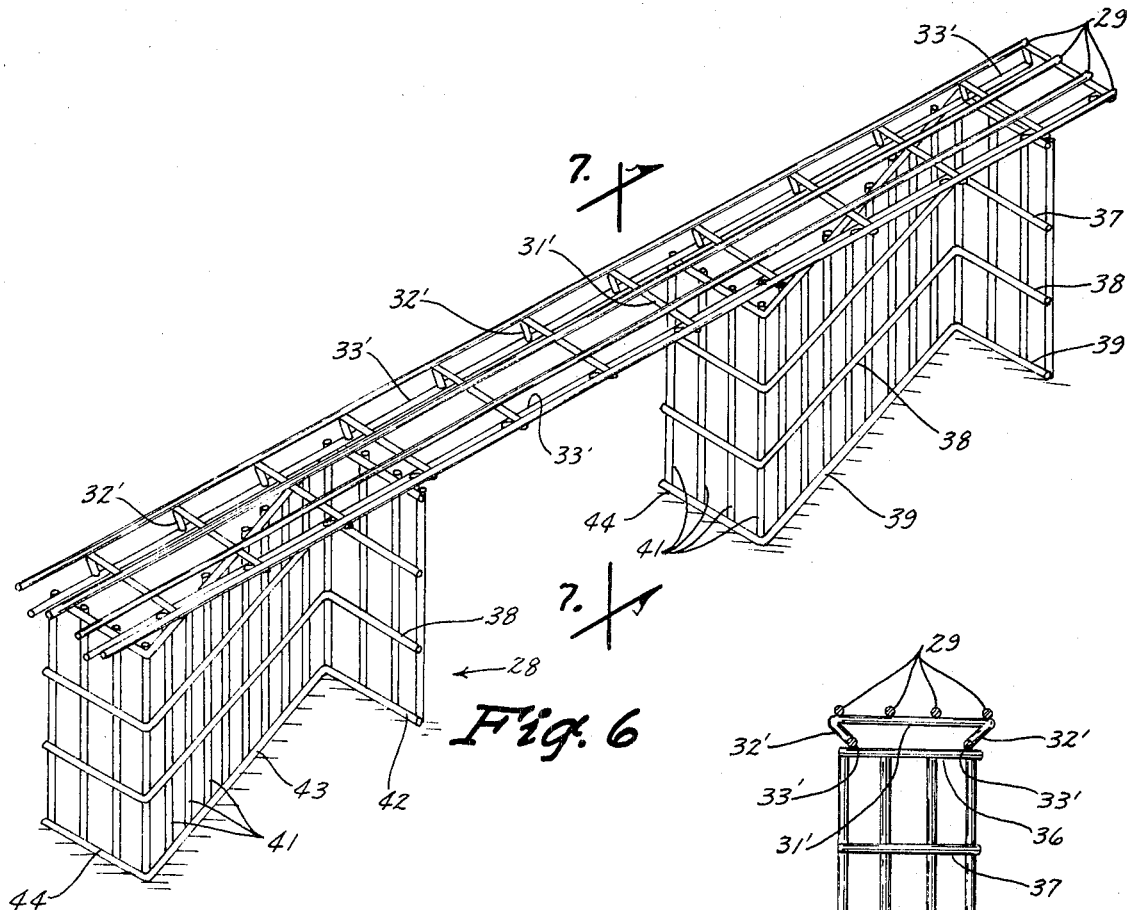
FIG. 6 is an enlarged perspective view of a modification of this invention.

Referring now to the drawings and particularly to FIG. 1, the device of this invention is indicated generally at 10 and is adapted for use inside a commercially available storage bin 11.

The storage bin 11 as depicted in FIG. 1 comprises a foundation composed of upright concrete posts or staves 12 arranged in circular fashion and snugly engaging one with another. The staves 12 are bound together by tension hoops 13. Within the staves 12 of the foundation is a floor 14 in the form of a concrete slab poured on the ground in order to exclude moisture which might arise from the ground.

To the top 16 of the staves 12 is attached a circular side wall 17 of galvanized steel having a ventilated umbrella-type roof (not shown) supported thereon.

A circular perforated floor 18 is provided mounted on the device 10 of this invention, the floor 18 being positioned at approximately the juncture 19 of the side walls 17 and the foundation staves 12 and substantially adjacent thereto. An L-shaped flashing (not shown) attached to the sidewall 19 may be provided for sealing around the marginal edge 21 of the floor 18.

The perforated floor 18 divides the bin 11 into two chambers, a bottom air transition or plenum chamber defined by the cement slab 14, staves 12 and the perforated floor 18 and an upper or storage chamber defined by the roof (not shown), the sidewalls 17, and the perforated floor 18.

For supplying fresh air internally of the bin 11 for passage through the grain within the previously defined storage chamber, a blower unit 22 having a fan 23 is connected to the bin 11 by a frame 24 placed between the staves 12 and upon operation forces air through a transition unit 26 to the plenum chamber beneath the perforated floor 18. The forced air circulates throughout the lower chamber and pushes upward through the floor 18 and grain stored thereon.

The device 10 of this invention suspending the perforated floor 18 comprises an elongated open frame member 27 (FIG. 2) disposed horizontally and resting upon a vertical self-standing base 28 or bases, the number of bases 28 depending upon the length of the frame member 27.

The frame member 27 includes a plurality of elongated bars 29 of steel or like material, each bar 29 attaching, as by welding, a plurality of cross-bars 31 traversing the elongated bars 29 thereby giving the frame 27 a gridiron form which permits an open but strong structure. The cross-bars 31 are angled substantially downward at both ends 32 to attach a side-bar 33 extending the length of the frame 27.

The elongated bars 29 are identical and extend the entire length of the frame 27 and substantially parallel to the longitudinal axis of the frame 27. The elongated bars 29 set within the same horizontal plane in assembled position so as to form a substantially flat support surface.

The cross-bars 31 traverse the bars 29 (FIGS. 2 and 3) substantially perpendicular to the longitudinal axis of the frame 27. It is to be recognized that the cross-bars 31 need not necessarily traverse the bars 29 perpendicularly but it has been found that this arrangement best serves the purposes intended for the support 10.

Upon traversing and being connected to each of the bars 29, each cross-bar 31 is bent downwardly at each end 32 an angle greater than 90° from the horizontal plane of the bars 29, and are connected to the side-bars 33 to add lateral support to the frame 27. The obtuse angle is important only in that it permits the frames 27 to be compactly stacked one within another for storage and shipping purposes, thereby conserving valuable space.

The side bars 33 extend substantially parallel to the longitudinal axis of the frame 27 and together with the downwardly angled ends 32 of the cross-bars 31 form flanged sides to the frame 27.

Figure 7:
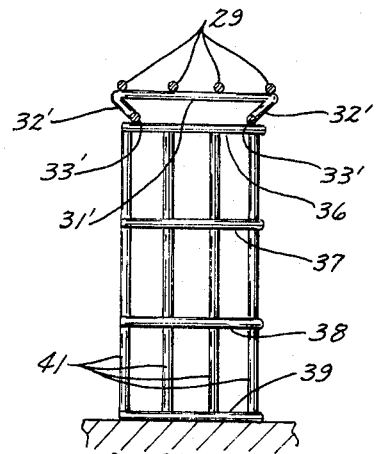
FIG. 7 is a cross-sectional view as taken along the line 7—7 of FIG. 6.
Figure 8:
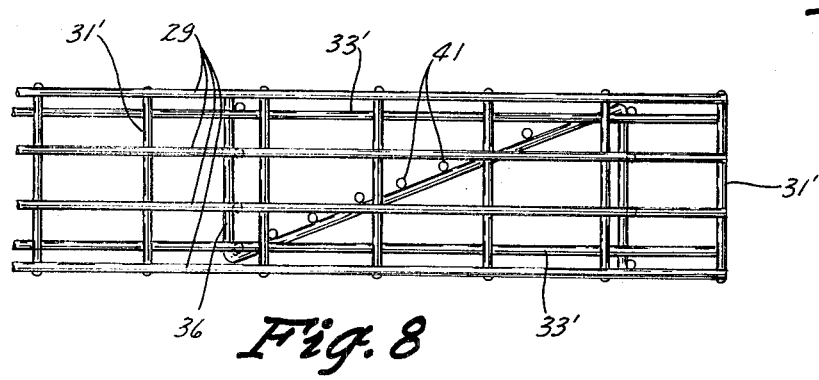
FIG. 8 is a plan view of FIG. 7.

A modification of the frame 27 is shown in FIGS. 6 and 7 wherein the ends 32' of the cross-bar 31' depend at an angle less than 90° and thus depend inwardly toward the base 28, rather than outwardly as do the ends 32. In this modification (FIGS. 6 and 7), the side-bars 33' engage the support arm 36 of each base 28 as hereinafter described and support the frame 27 thereby in addition to adding lateral support to the frame 27.

Each base 28 (FIGS. 2, 3 and 4) of the support device 10 is substantially Z-shaped in plan view (FIG. 4) and comprises a plurality of generally Z-shaped first members 36, 37, 38 and 39 of steel rod or like stock, the first members 36, 37, 38 and 39 being horizontally disposed and vertically spaced in assembled position. The first members 36, 37, 38 and 39 are attached, as by welding, to a plurality of substantially vertically disposed, horizontally spaced second members, all of which are indicated by the numeral 41. The second members 41 are identical and comprise straight rods. In elevational view (FIG. 3) the horizontal first members 36, 37, 38 and 39 crossing the vertical second members 41 give the base an open gridiron appearance.

The first members 36, 39 attach laterally to the vertical tips of the second members 41 to form an integral horizontal surface or support arms for the upstanding base 28. Thus the first member 39 forms a horizontal level surface to engage the slab floor 14 of the bin 11 (FIGS. 1 and 3) and the first member 36 forms a horizontal level surface to engage the underside of the horizontal frame portion 27 (FIGS. 2 and 4).

The basic Z-shape of the base 28 divides the base 28 into three integral portions 42, 43 and 44 (FIG. 2) which provides the base 28 with the contour necessary to be free standing and provides a broad support surface 36 necessary to balance the horizontally crossing frame portion 27 of the device 10. This feature of the device base 27 enables the base 27 and frame 28 to be assembled and positioned without the need for attachment accessories thereby alleviating the need for any tools in assembling the device 10. The identical, integral, and stationary shape of the base 28 permits compact stacking for storage and shipping purposes.

The compact storage feature of the device 10 of this invention, in addition to its strength and capability of being assembled without need for tools makes the device 10 conducive to applications other than supporting a perforated floor 18. The device 10 may also find use in the warehousing and lumbering fields where it is desirable to suspend items 48 (FIG. 5) above the ground or a floor 49.

To assemble the device 10 of this invention, one or more bases 28 (FIG. 1) are set vertically upon a substantially flat surface 14 with the bottom horizontal member 39 (FIG. 3) engaging the surface 14. If the horizontal frame 27 of the device 10 is to be extended a considerable length, a plurality of bases 28 are set in a row with the longitudinal axis of the bases 28 being aligned in a substantially straight line. The spacing between the bases 28 is determined by the weight of the object to be supported, such that a lighter load would permit wider spacing and heavier loads would dictate closer spacing. If a broad load is to be suspended from the floor 14, 49 (FIGS. 1 and 5), a plurality of rows of bases 28 are set, the longitudinal axis of each row being substantially parallel. The broken lines 46 of FIG. 1 indicate possible placements for the bases 28 on the bin floor 14.

Once the bases 28 are substantially alinged in a row, the frame member 27 is placed upon the bases 28, with the flanged sides formed by the angled portions 32 of the cross bars 31 and the side bars 33 overlapping the bases 27, and the longitudinal axis of the frame 27 paralleling the longitudinal axis of the base 28. The base 28 fits snugly within the flanged sides as best illustrated in FIGS. 3 and 4, thereby preventing lateral movement of the frame 27 upon the substantially smooth surface of the support arm 36. As the length of the vertical members 41 of the bases 28 are all identical, the frame member 27 resting upon the base 28 is necessarily parallel to the floor 14, and thereby provides a substantially horizontal support upon which to suspend a floor 18 or an object 48.

The open gridiron construction of the bases 28 and the frame 27 (FIG. 1) permit air circulated about the plenum chamber by the fan 23 and blower unit 22 to circulate undisturbed throughout the plenum chamber and to dissipate unhampered upwardly through the perforations 47 formed about the entire floor 18 and through the crop thereon stored within the storage chamber of the bin 11.

Although a preferred embodiment and a modification of this invention has been illustrated, it is recognized that variations and modifications may be made without departing from the spirit of the invention as defined in the appended claims.

I claim:
1. A support device for suspending a perforated floor above the ground floor of a storage bin, comprising:
   a series of independently spaced elongated gridiron frames, said frames being horizontally disposed and engaging the underside of the perforated floor, said frames being disposed in parallel relation to each other; and
   a series of independently spaced, vertical gridiron bases engaging the under surface of said frames, the bases being longitudinally aligned under said frames, said bases having integral horizontally disposed support arms engaging said frame and the ground floor, respectively,
   and wherein said frames each comprises a plurality of elongated first bars and a plurality of second bars traversing and connected to said first bars, said second bars bent downwardly at each end thereof to overlap said bases.

2. A support device for suspending a perforated floor as defined in claim 1, wherein said bases comprise a plurality of identical, substantially Z-shaped, horizontal rods, said Z-shaped rods traversing and attaching a plurality of identical vertical straight rods.

3. A support device for suspending a perforated floor as defined in claim 2, wherein the uppermost Z-shaped rod attaches laterally to the tip of the vertical rods to form a horizontal surface for engaging said frame, and the bottom-most Z-shaped rod connects the lateral tip of the vertical rod to form a horizontal surface for engaging the ground floor.

4. A support device for suspending a perforated floor as defined in claim 1, wherein Z-shaped rods engage the longitudinal tips of the vertical rods to form horizontal support surfaces for engaging said frame and the ground floor.

References Cited
UNITED STATES PATENTS

| | | | |
|---|---|---|---|
| 553,305 | 1/1896 | Fordyce | 52—650 X |
| 1,087,987 | 2/1914 | Schultz | 52—687 |
| 1,570,814 | 1/1926 | Woolley | 52—687 |
| 2,818,009 | 12/1957 | Steffen | 52—303 X |
| 3,094,745 | 6/1963 | Stout | 52—687 X |
| 3,283,459 | 11/1966 | Beranek et al. | 52—263 |
| 3,426,445 | 2/1969 | Steffen | 52—192 |

ALFRED C. PERHAM, Primary Examiner

U.S. Cl. X.R.

52—687, 690, 303

UNITED STATES PATENT OFFICE
CERTIFICATE OF CORRECTION

Patent No. 3,512,322                      May 19, 1970

Vincent B. Steffen

It is certified that error appears in the above identified patent and that said Letters Patent are hereby corrected as shown below:

In the heading to the printed specification, lines 4 to 6, cancel "assignor to Dover Corporation (De-Sta-Co Division), a corporation of Delaware".

Signed and sealed this 19th day of January 1971.

(SEAL)

Attest:

Edward M. Fletcher, Jr.

Attesting Officer

WILLIAM E. SCHUYLER, JR.

Commissioner of Patents